March 21, 1961  P. GREGER  2,975,687
PHOTOGRAPHIC CAMERA

Filed June 5, 1959  4 Sheets-Sheet 1

INVENTOR
Paul Greger
BY: Max Klum
ATTORNEYS

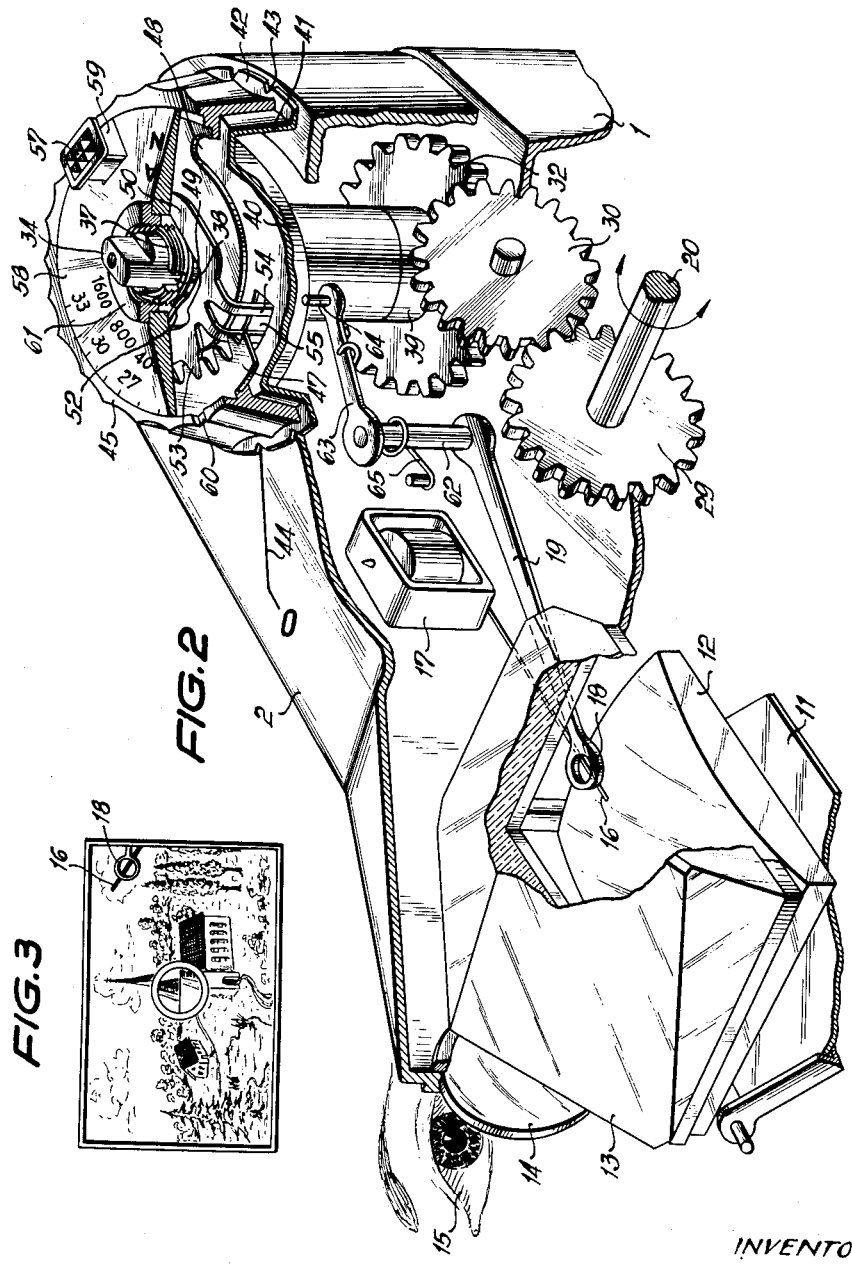

March 21, 1961 P. GREGER 2,975,687
PHOTOGRAPHIC CAMERA
Filed June 5, 1959 4 Sheets-Sheet 3
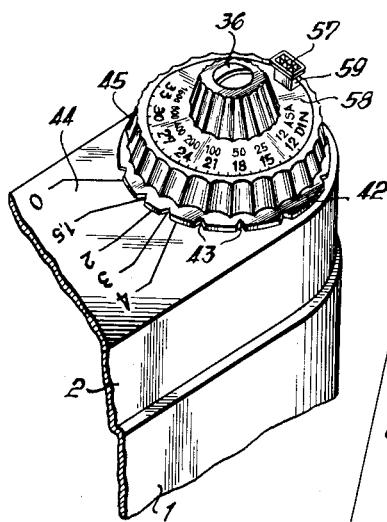
FIG. 5
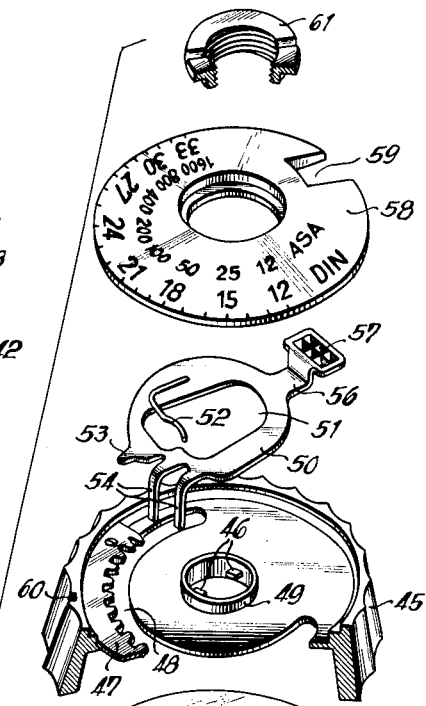
FIG. 4
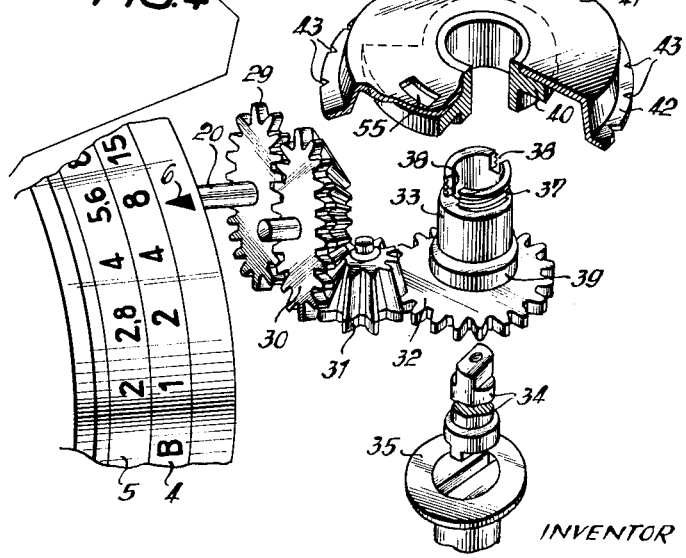
INVENTOR
Paul Greger
BY: Mon. Shum
ATTORNEYS March 21, 1961 P. GREGER 2,975,687
PHOTOGRAPHIC CAMERA
Filed June 5, 1959 4 Sheets-Sheet 4

INVENTOR
Paul Greger
BY: Maca . Klun
ATTORNEYS

United States Patent Office 2,975,687
Patented Mar. 21, 1961

2,975,687
PHOTOGRAPHIC CAMERA

Paul Greger, Braunschweig, Germany, assignor to Voigtländer A.G., Braunschweig, Germany, a corporation of Germany Filed June 5, 1959, Ser. No. 818,327

Claims priority, application Germany July 18, 1958

4 Claims. (Cl. 95—10)

This invention relates to photographic cameras having a built-in electric exposure meter and it has particular relation to photographic cameras of this type in which the camera body has an adjusting handle arranged thereon operable to conjointly adjust a follow-up mark with respect to the pointer of the exposure meter and to operate a mechanism for displacement of the exposure value adjuster of an objective shutter.

This adjusting device operates in such a manner that—when, by displacement of the adjusting handle or knob, the follow-up mark is adjusted to the deflection of the exposure meter pointer—at the same time the objective shutter is likewise in a position of exposure value adjustment corresponding to the indication of the exposure meter.

It has been known previously to include, in the mechanism between the adjusting handle and the follow-up mark, a scale of the film sensitivity values and a mark, adjustable in itself, for consideration of the film sensitivity value. Thereby, the follow-up mark obtains a certain fixed preliminary adjustment relative to the exposure value adjuster of the objective shutter. If in the same manner, i.e. by additional displacement of the transmission gear, it is tried to take into consideration also the filter factors, then, after effecting a filter factor adjustment, the latter would have to be cancelled if the use of the filter is discontinued. If this is omitted, then the adjusted filter factor will be effective in any later adjustment of the device.

Such defective adjustments are not possible in the procedure according to the present invention. According to the latter, in a camera of the abovementioned type—for the purpose of displacing the adjusting device in order to take additionally into consideration filter factors, after adjustment of the exposure value—an arrangement including a scale calibrated according to filter factors and marks pointing to said scale, is provided, and said arrangement is applied to the adjusting handle or knob on the one hand and to the camera body on the other hand. In such a case it is possible—after by adjustment of the handle the follow-up mark has been brought to coincidence with the exposure meter pointer and the shutter thus adjusted to the corresponding exposure value—to adjust the handle for additional consideration of a filter factor by the aid of the beforementioned adjusting marks. Thereby the follow-up mark and the exposure value adjuster are relatively displaced in conformity with the filter factor. If the filter factors are taken into consideration in this manner, the effect of adjustment of the filter factor is cancelled during any subsequent adjustment of follow-up mark and shutter. Therefore, it cannot happen that an adjusted filter factor would enter the adjustment of exposure value for any subsequent photographic picture.

According to a preferred embodiment of the adjusting device, a scale calibrated in accordance with the filter factors is arranged on the camera body and the marks pointing to the scale are arranged on the adjusting handle.

As, prior to the consideration of a filter factor, the adjusting handle can be in any position in front of the scale, it is of advantage if the adjusting handle carries several marks, whereby the mark which is located in the initial position opposite the zero point of the scale, is the reference mark used for displacement of the handle relative to the scale. These marks need not be provided directly on the adjusting handle, and they can be arranged on a carrier which is coupled with the adjusting handle and participates in its displacements.

According to a particularly advantageous embodiment of the adjusting device, it is contemplated to arrange, on the upper side of the camera cap, a setting or adjusting button which is coupled, on the one hand, by means of gearing with the exposure value adjuster of the camera shutter, and is connected, on the other hand, with a cam disc which controls movements of the follow-up mark. In addition, thereby, in the connection between the setting button and the cam disc, a device, which is adjustable to the inherent play of the gearing, is inserted, and a setting or adjusting disc is fixedly connected with the cam disc, and carries marks cooperating with a filter factor scale located on the camera cap. The cam disc and the setting disc connected therewith can be, furthermore, displaceably arranged relative to the setting button by the aid of a scale of film sensitivity values.

The appended drawings illustrate by way of example some specific embodiments of and best modes for carrying out the invention, to which the invention is not limited.

In the drawings:

Fig. 2 is a partial perspective view of the upper side of the camera shown in Fig. 1, the camera cap being partially broken away;

Fig. 3 is an image of the type seen by the operator of the camera upon looking into the finder;

Fig. 4 is an exploded perspective view of the individual parts of the adjusting device shown in assembled condition in Figs. 1 and 2;

Fig. 5 is a partial perspective view of the upper side of the camera and those parts of the adjusting device which are accessible by hand;

Figure 1:
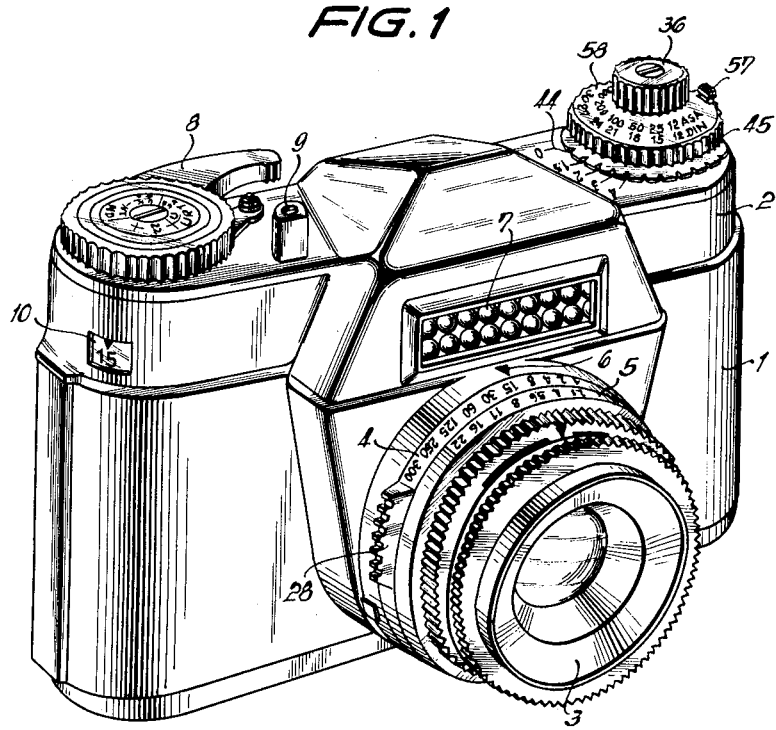
Fig. 1 is a perspective view of a camera embodying the present invention.

The camera shown in the drawings is a single lens reflex camera, i.e. a camera in which, in the path of rays between the picture taking objective and the light sensitive layer, a tiltable mirror is arranged which, when tilted into said path of rays, deflects the light to a finder device. After the mirror is tilted out of the path of rays, the light can reach the light sensitive layer. Cameras of this type have been known from the art.

In the drawings 1 denotes the body of such a camera, the narrow upper side of which is covered by a camera cap 2. The objective mount body 3 forms a structural unit with the objective shutter, the adjusting rings of which, for shutter time and diaphragm, are denoted 4 and 5, respectively. The scales for exposure time and diaphragm, provided on these adjusting rings, cooperate with a common stationary mark 6. Above the objective mount body 3, the photocell 7 of an electric exposure meter built-in in the camera cap 2 is located. Also illustrated in Fig. 1 are a film feed lever 8, a shutter release key 9 and a window 10 through which the counting disc of a film counting mechanism can be seen. Shown at the other end of the camera cap are the adjusting means of the adjusting device for the exposure value to be adjusted with the aid of the indication of the exposure meter, as described more fully hereinafter.

The illustration in Fig. 2 is on a somewhat enlarged scale, in comparison with Fig. 1, and shows only that part of the camera cap, which contains the adjusting device. In addition, in this figure, mirror 11 tilted into the path of rays of the objective can be seen. This mirror reflects the light rays of the objective to a field lens 12 seated in camera body 1, and the field lens forms an image. Above field lens 12, a prism 13 and an ocular 14 are seated, through which the eye 15 can observe the picture, formed by field lens 12, in upright and in correct lateral position. Projecting into the space between field lens 12 and prism 13 is the pointer 16 of the measuring instrument 17 connected with photocell 7 (Fig. 1) as well as a follow-up mark 18 which forms the free end of a lever 19. In this manner, the person looking into ocular 14, can recognize the pointer 16 and follow-up mark 18, even on the edge of the finder image, as shown in Fig. 3.

Figure 6:
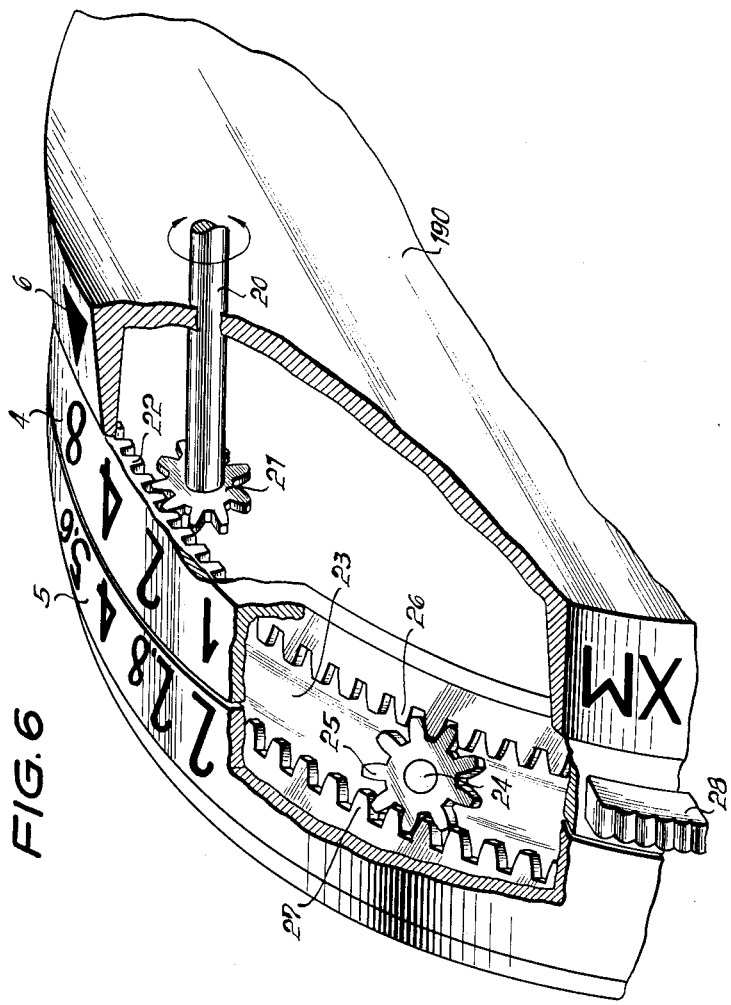
Fig. 6 is a partial perspective view of the wall of an objective shutter facing the camera body, the casing of the shutter is partially broken away.

The adjusting rings 4 and 5, for exposure time and diaphragm, can be displaced by means of the adjusting device seated on camera body 1. For coupling with this device, the shutter is provided with a shaft 20, which projects from its wall 190 facing the camera body 1 (see Fig. 6). This shaft 20 is coupled with the adjusting device shown in detail in Fig. 4. The free end (which lies within the shutter casing) of this shaft 20 carries a pinion 21, which meshes with an internal ring gear fixed on an adjusting ring 23. Seated on the outer surface of setting ring 23 is a pinion 25, which is rotatable on pin 24. This pinion 25 meshes with facing ring gears 26 and 27 provided in exposure time adjusting ring 4 and diaphragm adjusting ring 5, respectively.

When, by turning shaft 20, adjusting ring 23 is moved, pinion 25, by its engagement with ring gears 26 and 27, will rotate adjusting rings 4 and 5 conjointly in the same direction whereby adjustment of the exposure value changes, because in the adjustment of increasing exposure periods, the opening of the diaphragm is simultaneously increased, and vice versa. A combination of exposure time and diaphragm, adjusted in this manner, can be changed to a differing combination while retaining the adjusted exposure value, if by grasping handle 28 on adjusting ring 4 for the exposure time, ring 4 is turned while shaft 20 is stationary. If this is done, by means of gearing 25, 26, 27 diaphragm adjusting ring 5 is turned in a direction which is opposite to the movement of exposure time adjusting ring 4. Upon displacement of exposure time adjusting ring 4 from one value to another value of double length, the diaphragm will be closed by one value so that there will be no change in the exposure value.

The adjusting device described in the above preceding two paragraphs, does not form part of the arrangements embodying the present invention, as far as said device is located within and on the shutter casing.

The end of shaft 20 which projects from rear wall 190 of the shutter casing carries a pinion 29, which—as shown in Figs. 2 and 4—is coupled through gears 30 and 31 with a gear 32. This gear 32 is rotatably arranged on the upper side of camera body 1, which is overlapped by camera cap 2. As can be seen in Fig. 4, a tubular member 33 is fixedly connected with gear 32. Shaft 34, which is arranged in camera body 1, passes through member 33 and shaft 34 is at the same time the shaft for film spool 35 housed by the camera body. Shaft 34 passes through all the parts which are shown in exploded view in Fig. 4, and carries at its free end a knurled knob 36 (see Figs. 1 and 5) which is the handle for advancing the film.

The free end of tubular member 33 is formed with an external thread 37 and with two recesses 38 and a shoulder or collar 39. A cam disk 40 fits loosely over member 33 and is seated on collar 39. This cam disk is fixedly connected with an adjusting disc 41 in assembled condition of the adjusting device. Uniformly spaced on the outer peripheral edge 42 of said disc 41, are marks 43, which serve as adjusting marks relative to a scale 44 provided on the outer surface of camera cap 2 (see Figs. 1, 2 and 5) as will be described here in more detail further below.

An adjusting member 45, also shown in Fig. 4, can be placed on tubular member 33, whereby two lugs 46 provided on member 45 engage recesses 38 of tubular member 33. Thereby adjusting member 45 will be non-rotatably connected with member 33 and thus—through gearing 32, 31, 30 and pinion 29—also with shaft 20. Member 45 is provided with a knurled rim, which partially overlaps adjusting disc 41, but does not cover its outer peripheral rim 42, as best shown in Fig. 5. Fastened to member 45 is an arcuate rack 47, parallel with which extends an arcuate recess 48. Furthermore, adjusting member 45 carries a tubular extension 49, which forms the bearing for a coupling slide 50, which has a central recess 51 receiving extension 49, recess 51 having the shape of an oblong hole. A spring 52 fixedly seated on slide 50 holds, by its engagement on extension 49, a tooth 53, providing on member 50, in engagement with rack 47, so that coupling slide 50 also participates in every displacement of adjusting member 45. Formed on the slide 50 are two coupling arms 54 which extend through recess 48 in member 45 and engage a recess 55 in disc 41 and cam disc 40. In this manner, a rotation effecting connection is established between adjusting member 45, disc 41, and cam disc 40.

Coupling slide 50 is also provided with a bent arm 56 which carries a handle member 57. By means of member 57, coupling slide 50 can be displaced—against the effect of spring 52—perpendicularly to tubular shaft 33, whereby tooth 53 is disengaged from rack 47 so that the connection between member 45 and slide 50 is released. After release of handle 57, tooth 53 of slide 50 is brought again in engagement with rack 47 by spring 52.

Above coupling slide 50, a scale disc 58 is arranged and has a recess 59 adapted to be engaged by bent arm 56 of coupling slide 50. In this manner, a rotation effecting connection is established between scale disc 58 and coupling slide 50. The scale disc 58 carries film sensitivity scales of DIN and ASA values, the scale divisions of which have to be adjusted and read relative to a mark 60 on member 45.

After their above described assembly, the parts individually illustrated in Fig. 4 are held together by a threaded ring 61, which is applied to the outer thread 37 of member 33. As already mentioned above, all parts are arranged on shaft 34, the free end of which carries the film advancing button 36. The assembled adjusting device is illustrated in Figs. 1 and 5.

As can be seen from Fig. 2, the lever 19, which carries the follow-up mark 18, is fixed on a shaft 62 which is rotatable in the camera body 1, and on which a scanning lever 63 provided with a scanning pin 64 is also fixed. Due to the action of a spring 65 on scanning lever 63, scanning pin 64 is held in constant engagement with cam disc 40. Thus, upon turning adjusting member 45, the shutter and, by means of cam disc 40 the follow up mark 18, are displaced through gearing 29–32.

The parts are relatively adjusted in such a manner that —when the follow up mark 18 is brought to coincidence with pointer 16 of the exposure meter in the manner illustrated in Fig. 3—the shutter will be adjusted to an exposure value which corresponds to the prevailing light conditions, i.e. to a combination of the exposure time and diaphragm which corresponds to said exposure value. If this adjusted combination is not suitable for the contemplated photographic picture, then, in the manner already described above, and while maintaining the adjusted exposure value, another combination of exposure time and diaphragm value can be adjusted by directly turning ring 4, whereby the position of follow-up mark 18 is not changed.

The film sensitivity value is taken into consideration by giving follow-up mark 18 a predetermined fixed preliminary adjustment relative to shaft 20 which latter brings about adjustment of the exposure value. This is done by changing the position of cam disc 40 relative to adjusting button 45. As already mentioned above, the connection between these two parts is established by coupling slide 50. If, by gripping and displacing member 57, tooth 53 of slide 50, is removed from its engagement with rack 47 on member 45, then upon turning slide 50 relative to member 45, the cam disc 40 is also moved. The scale disc 58 also participates in this rotation, and the scale of disc 58 moves then relative to mark 60 on member 45. When the film sensitivity value of the film used is opposite to mark 60, the holding piece 57 is released, so that its tooth 53 can engage again rack 47 under the effect of spring 52 and the fixed connection between adjusting member 45 and cam disc 40 is again established.

Filters inserted in front of the picture taking objective, require a change of the exposure value determined by adjustment of the follow-up mark 18 to the pointer 16. As can be seen in Fig. 5, on the camera cap 2 a scale 44 is arranged, which is calibrated according to increasing filter factors and cooperates with setting disc 41. If adjustment to the prevailing light conditions has been obtained by coinciding mark 18 with the deflected pointer 16 and if for the contemplated photographic picture a filter having a filter factor of e.g. "2" is used, then this factor is taken into consideration by turning adjusting button 45 in such manner that the particular one of the marks 43 which is then located just opposite scale division "0" of scale 44, is adjusted to scale division "2" of this scale 44. Thereby, the exposure value in the shutter is changed to an extent corresponding to said factor "2." This adjustment is effected, after mark 18 has been brought into coincidence with pointer 16, by turning knob 45 which conjointly moves mark 18 and shaft 20. Movement of shaft 20 changes the exposure value. Thereby, after adjustment of the filter factor, mark 18 no longer coincides with pointer 16 but is displaced from the latter by an amount corresponding to the adjusted filter factor.

It will be appreciated that a gear train composed of gears only and capable of being turned in both directions, cannot be completely free from play. In the above described adjusting device too, such a play is present between adjusting button 45 and shaft 20 on the shutter. As upon displacement of adjusting button 45, at the same time the follow-up mark 18 is likewise moved, it could happen that, up a movement of follow-up mark 18, the corresponding displacement of shaft 20—which determines the exposure value adjustment of the shutter—will not occur. In order to avoid such defective adjustments, the connection between adjusting member 45 and cam disc 40—which controls follow-up mark 18—is not rigid, and it has the same play as that present between adjusting member 45 and shaft 20 on the shutter. The connection between said member 45 and cam disc 40 is established by slide 50, the coupling arms 54 of which engage the recess 55 of adjusting disc 41 and of the cam disc 40. Said recess 55 extends over an angular range of such dimensions that said slide 50 can turn, relative to cam disc 40 and setting disc 41, before an engagement between one of the two coupling arms 54 on one of the lateral limiting edge of recess 55 occurs. The amount of this play of coupling arms 54 within recess 55, can be adjusted to the play within the gear train 29 to 32, by bending the coupling arms 54 toward each other, or away from each other. By such adjustment—to be carried out during assembling the device—it can be attained that, upon turning adjusting member 45, follow-up mark 18 starts movement only at the moment at which, after overcoming the play within gear train 29–32, the shaft 20 of the shutter is displaced. Therefore—in spite of the play present—always a simultaneous displacement of the follow-up mark 18 and shaft 20 will occur.

Summing up, the camera according to the present invention is operated in such a manner that, after adjustment of scale disc 58 to the sensitivity value of the film used, upon looking into the ocular 14 of the finder, at the same time the photo-cell 7 is exposed to the light incident from the scenery of picture taking. This causes deflection of the exposure meter pointer 16, which is visible at the edge of the finder image, and the follow-up mark 18—which can be likewise seen on the edge of the finder image—is then adjusted to said deflection, by turning adjusting button 45. At the same time the exposure time and diaphragm value are adjusted in conformity with the exposure value. The combination thus adjusted can be changed, if necessary, by turning time adjusting ring 4, to another combination of exposure time and diaphragm, which corresponds to the same exposure value. If in the contemplated photographic picture a filter is used, then the lengthening factor of said filter is also taken into consideration by adjustment of adjusting button 45 with the use of marks 43 and scale 44. Upon the subsequent release of the shutter, the light sensitive material is affected by the light in conformity with the available light conditions.

It will be understood from the above that this invention is not limited to the specific designs, constructions, steps, parts and other details specifically described above and illustrated in the drawings and can be carried out with various modifications without departing from the scope of the invention as defined in the appended claims.

What is claimed is:

1. A photographic camera comprising, in combination, a built-in electric exposure meter having a movable pointer; a follow-up indicator operatively associated with said pointer; an objective shutter having an exposure value adjuster; mechanism operable to displace said adjuster; a setting element movably mounted on the camera and operatively coupled to said indicator and said mechanism for conjointly adjusting said indicator to coincide with said pointer and said adjuster in correspondence with the position of said indicator; a scale calibrated in accordance with filter factors and including a reference indication; a plurality of uniformly spaced marks cooperable with said scale; one of said scale and said plurality of marks being fixedly arranged on the camera and the other on said setting element; whereby, after movement of said setting element to adjust said indicator into coincidence with said pointer, with one of said marks or the space between adjacent marks being brought into substantial coincidence with said reference indication, said setting element may be further moved, prior to taking the picture, to bring such one mark or space into coincidence with the filter scale factor corresponding to any filter then being used on said camera; such further movement of said setting element displacing said indicator out of coincidence with said pointer by an amount corresponding to the selected filter scale factor.

2. A photographic camera, as claimed in claim 1 in which said scale of filter factors is applied to the camera body and said marks are applied to said adjusting handle.

3. A photographic camera, as claimed in claim 1, comprising a scale calibated according to filter factors and arranged on the camera body and a carrier which is coupled with the adjusting handle and participates in movements of the latter, and carries the marks cooperable with said scale.

4. A photographic camera, as claimed in claim 1, comprising a camera cap, said setting element being rotatably arranged on the upper side of said camera cap; gearing connecting said setting element to said adjuster and susceptible of backlash; a cam disk; a connection between said setting element and said cam disk; a cam follower movable with said follow-up indicator and engaging said cam disk; and an adjusting device included in said connection and manually adjustable to introduce into said connection an amount of play equal to the amount of said backlash.

References Cited in the file of this patent
UNITED STATES PATENTS

| | | |
|---|---|---|
| 2,418,370 | Simmon | Apr. 7, 1947 |
| 2,879,702 | Gossen | Mar. 31, 1959 |
| 2,887,026 | Rentschler | May 19, 1959 |